United States Patent [19]
Patton

[11] Patent Number: 5,857,933
[45] Date of Patent: Jan. 12, 1999

[54] CHAIN ASSEMBLY WITH FLAT LINKS OF EXTENDED HORIZONTAL LENGTH

[75] Inventor: Mark E. Patton, Dryden, N.Y.

[73] Assignee: Borg-Warner Automotive, Inc., Sterling Heights, Mich.

[21] Appl. No.: 934,190

[22] Filed: Sep. 19, 1997

Related U.S. Application Data

[62] Division of Ser. No. 554,929, Nov. 9, 1995, Pat. No. 5,813,934.

[51] Int. Cl.$^6$ ................................................. F16G 13/04
[52] U.S. Cl. ............................................................ 474/213
[58] Field of Search .................................. 474/202, 206, 474/212–214

[56] References Cited

U.S. PATENT DOCUMENTS

| | | |
|---|---|---|
| 645,797 | 3/1900 | Eshelman . |
| 1,463,789 | 8/1923 | Braddock . |
| 3,046,806 | 7/1962 | Collins . |
| 4,832,187 | 5/1989 | Lapeyre ................................ 474/212 X |
| 4,973,293 | 11/1990 | Kuehl ....................................... 474/212 |
| 5,170,883 | 12/1992 | Ledet et al. ............................. 198/834 |
| 5,427,580 | 6/1995 | Ledyina et al. ........................... 474/84 |

FOREIGN PATENT DOCUMENTS

| | | |
|---|---|---|
| 1266877 | 6/1961 | France . |
| 54-120348 | 1/1981 | Japan . |
| 5-17251 | 3/1993 | Japan . |

*Primary Examiner*—Roger Schoeppel
*Attorney, Agent, or Firm*—Sidley & Austin; Greg Dziegielewski

[57] ABSTRACT

A phased chain and sprocket assembly is provided in which the pitch length of the chain is not matched to the pitch length of the sprocket. Specifically, the chain link pitch length is approximately twice the pitch length of the associated sprocket teeth. By providing two chains in side-by-side, but offset relation, a phased chain and sprocket assembly can be achieved without the need for circumferentially offset sprockets.

3 Claims, 2 Drawing Sheets

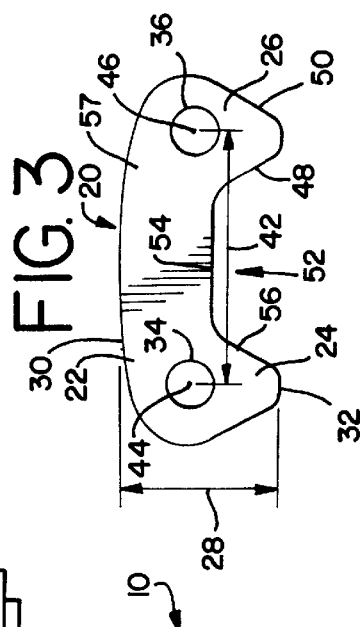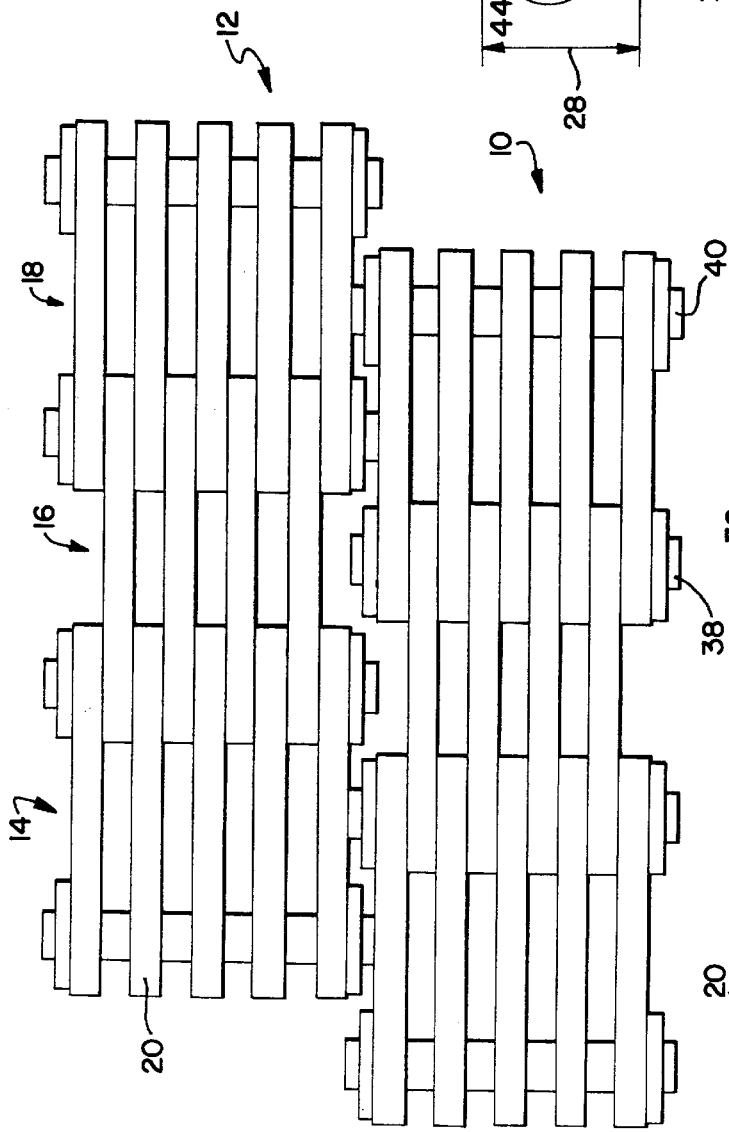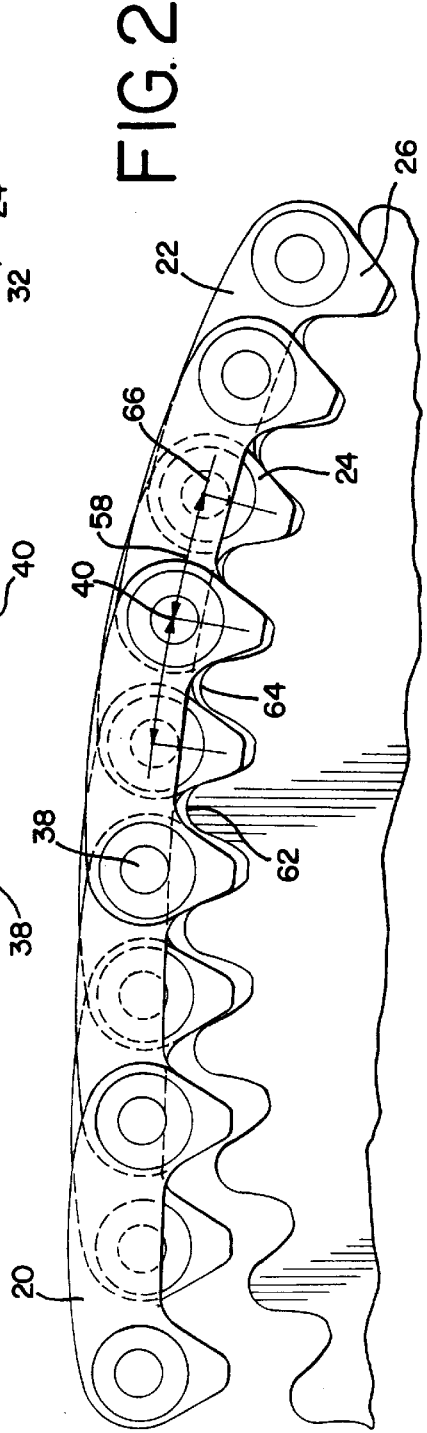

CHAIN ASSEMBLY WITH FLAT LINKS OF EXTENDED HORIZONTAL LENGTH

This application is a division of application Ser. No. 08/554,929, filed Nov. 9, 1995, now U.S. Pat. No. 5,813,934.

BACKGROUND OF THE INVENTION

The subject matter of this application relates to the subject matter of U.S. Pat. No. 5,427,580, entitled "Phased Chain Assemblies," issued Jun. 27, 1995, the subject matter of which is incorporated herein by reference.

The present invention relates generally to power transmission chains. The invention has particular application to power transmission chains of the inverted tooth or silent chain variety, which are used in automotive engine timing applications, and also can have automotive applications in the transfer of power from a torque converter to a transmission or in a transfer case of a four-wheel drive vehicle.

One type of power transmission chain is referred to as silent chain. Such chain is formed of interleaved sets of inverted tooth links. A set or row of links is assembled from several links positioned alongside of or adjacent to each other. The links are connected by pivot means, which are typically round pins received in a pair of apertures.

Conventional silent chains typically include both guide links and inverted tooth links. The guide links are positioned on the outside edges of alternate rows of links. The guide links typically act to position the chain laterally on the sprocket. Guide links typically do not mesh with the sprocket.

The inverted tooth links, or sprocket engaging links, provide the transfer of power between the chain and the sprocket. Each inverted tooth link typically includes a pair of apertures and a pair of depending toes or teeth. Each toe is defined by an inside flank and an outside flank. The inside flanks are typically joined at a crotch. The inverted tooth links are typically designed so that the links contact the sprocket teeth to transfer power between the chain assembly and the sprocket. The inverted tooth links or driving links contact the sprocket teeth along their inside link flanks or their outside link flanks or combinations of both flanks. The contacts between the links and sprocket teeth can be of the type which provide a power transfer, or can be of the nature of an incidental contact, or can include root contact or side contact.

A conventional silent chain drive is comprised of an endless silent chain wrapped about at least two sprockets supported by shafts. Rotation of a driving sprocket causes power transmission through the chain and consequent movement of a driven sprocket. In an engine timing drive application, the driving sprocket is mounted on the engine crankshaft and the driven sprocket is mounted on the engine camshaft.

Chain assemblies are typically constructed of links of a matching pitch length. In round pin silent chains, the pitch length is the distance between the centers or center points of the pair of round apertures on each link. The links of the chain are typically provided with the same or approximately the same (within manufacturing tolerances) pitch length. In turn, the sprockets associated with this chain are constructed of a pitch length that matches the chain pitch length. The pitch length of a sprocket is conventionally measured as the distance between the adjoining sprocket teeth as measured along the sprocket pitch circle. In such a chain and sprocket system, the links of each of the successive rows of the chain will initially contact each successive sprocket tooth as the chain enters the sprocket and then proceeds to seat in the sprocket.

Chain assemblies of the prior art have included double pitch roller chains. In such chains, the links span two adjacent sprocket teeth so that the pins are separated by two sprocket teeth. It is believed that the prior art may have included double pitch silent chains, but only in the form of low speed conveyor chain, and not for any high-speed automotive applications.

The present invention has particular application to chain assemblies in which the chains or sprockets are offset, or phased, to modify the impact noise spectrum and chordal action noise spectrum. In a typical phased chain system, a single chain assembly is divided into, or replaced by, two side-by-side chains that are phased or offset by one-half pitch. In one embodiment of the present invention, the chain link structure is utilized on two chains that are in side-by-side relationship. The chain link has a pitch length that is approximately twice the pitch length of the associated sprocket. Two such chains are placed in side-by-side, but phased relationship. The system achieves phasing without the need to circumferentially offset the sprockets with respect to one another. The successive rows of each chain initially contact every other successive tooth of the associated sprocket. The contacting of every other tooth provides the phasing of the chain to sprocket contacts.

Noise is associated with chain drives. Noise is generated by a variety of sources, but in silent chain drives it can be caused, in part, by the impact sound generated by the collision of the chain and the sprocket at the onset of meshing. The loudness of the impact sound is affected by, among other things, the impact velocity between the chain and the sprocket and the mass of chain links contacting the sprocket at a particular moment or time increment.

Many efforts have been made to decrease the overall noise level and pitch frequency noise distribution in automotive chain drives to minimize the objectionable effects of the pure sonic tones. Several of those efforts are discussed in the above-mentioned U.S. Pat. No. 5,427,580. The present invention finds application along with some of the noise reduction concepts discussed in the above-mentioned application, including randomization and phasing of the chain assemblies. However, the present invention has broader applications to chain systems that include, for example, non-phased sprockets.

Phasing the chain and sprocket relationship can reduce the number of chain links (or mass) impacting the sprocket during a given time increment. Similarly, phasing the chain and sprocket relationship can alter or phase the chordal action or articulation of the chain and sprocket.

However, the use of a phased chain system often involves two chains that are placed in side-by-side and phased relation. The two side-by-side sprockets are then circumferentially offset by approximately one-half pitch. Such a system requires manufacture and assembly of sprocket systems that provide the described circumferential offset. The present invention, in one embodiment, avoids the need for circumferentially offset sprockets. This is accomplished by utilizing two chains in side-by-side relationship with the links of the chains having a pitch length approximately twice the length of the sprocket pitch and the chains being positioned on the sprockets with their pins being displaced by one half pitch.

SUMMARY OF THE INVENTION

The present invention relates to phased chain assemblies or systems. That is, automotive transmission, transfer case or engine timing systems in which the sprockets are split into two portions, or comprise two separate sprockets. In one embodiment, two chains are placed in side-by-side, but spaced apart relation. The chains are offset with respect to one another. That is, the pins of the two chains are laterally offset by a portion of one pitch length.

More particularly, in the present invention, the chains have links of a pitch length that differs from the pitch length of the sprocket teeth. That is, the chains and sprockets are of unmatched pitch length. The two chains are preferably constructed of a pitch length that is approximately twice the pitch length of the associated sprocket teeth. The two chains are preferably offset by one-half of the chain pitch length (or the pitch length of the sprockets). As the links of successive rows of each chain enter the driving sprocket, the rows of the chain will contact every other sprocket tooth. In other words, the first row of chain teeth will contact a sprocket tooth and then the chain links will skip the adjacent sprocket tooth. The next successive row of chain teeth will then contact the third sprocket tooth. As the chain seats into the sprocket, the inverted teeth of the chain will fit into every other root of the associated sprocket, or the individual links will span the length of two adjacent sprocket teeth.

By providing two such chains in offset relationship, the first chain will contact the sprocket teeth in a sequence of the first, third, fifth, and the remaining "odd" numbered sprocket teeth. The second chain, by being offset by one-half chain pitch from the first chain, will contact the sprocket teeth of the adjacent sprocket in a sequence of the second, fourth, sixth, and the remaining "even" numbered sprocket teeth. As noted above, the two adjacent sprockets are preferably not circumferentially offset, and thus the first, second, third and remaining teeth of the first sprocket are circumferentially aligned with the first, second, third and remaining teeth of the second sprocket.

The above-described assembly achieves a phased system by having the links of one chain contact the sprocket teeth of the first sprocket out of phase by one sprocket tooth with the contact of the links of the second chain with the second sprocket teeth. The assembly achieves a phased chain system without the necessity to provide circumferentially offset sprockets. This phasing continues around the entire length of each sprocket. Thus, in assemblies in which the sprockets have an odd number of teeth, one sprocket will skip "even" numbered teeth and then "odd" numbered teeth.

The novel chain construction includes links of a pitch length that is not matched to the pitch length of the associated sprockets. In the preferred embodiment, the length of the body portion of the link, i.e., the portion between the two apertures is lengthened with respect to a typical chain link.

As noted above, the present invention has particular application with phased chain assemblies or systems. That is, high speed automotive transmission, transfer case or engine timing systems in which the sprockets are split into two portions or separate assemblies and the chains are offset or phased with respect to one another.

Each of the embodiments of the present invention, as well as certain other embodiments, may include a plurality of chain assemblies, including assemblies of two, three, or four chain strands. Additionally, the pitch length of the links may be any integral multiple of the pitch length of the sprocket. In such cases, the chain assemblies may be phased by ¼, ⅓ or ½ or other fractions of the chain link pitch. It is also possible to combine some phased sprockets with unphased sprockets if more than two chains are used.

In each chain assembly, the links are interleaved to form sets of links. Each link includes a pair of apertures, with an aperture from one set of links being aligned for interlacing with an aperture from an adjacent set of links. Pivot members, in the form of round pins or rocker joints, are utilized to connect the adjacent sets of links through the apertures, and to allow pivoting of the sets of links with adjacent sets.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale:

FIG. 1 is a top view of portions of a pair of chain assemblies of one embodiment of the present invention, as aligned on a pair of adjacent sprockets;

FIG. 2 is a side view of the two chains of FIG. 1, illustrating the contact of the chains with the sprocket in side and phantom view; and, FIG. 3 is a side elevation view of a link of the chain assembly of the present invention.

DETAILED DESCRIPTION OF THE PREFERRED EMBODIMENTS

Figure 4:
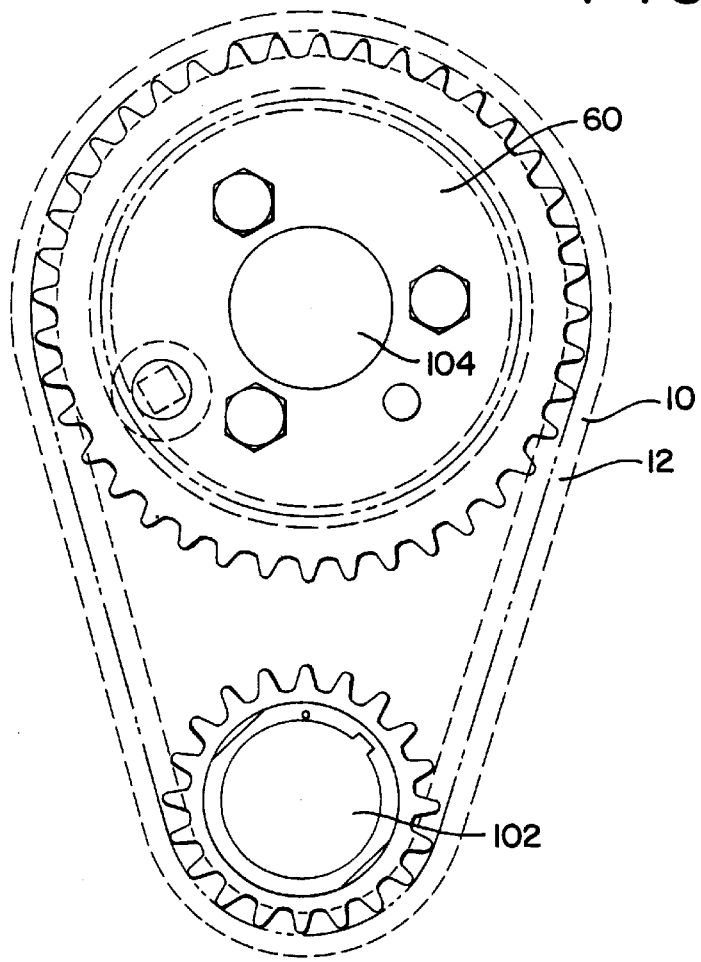
Figure 5:
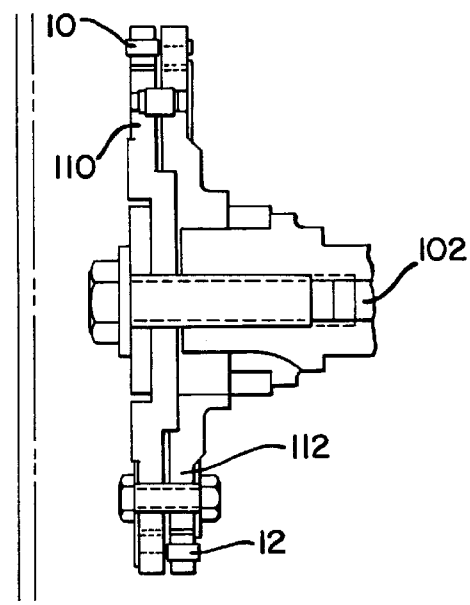

As shown in the drawings, which are not to scale, the present invention is directed to providing phasing of chain assemblies and the associated sprockets. The phasing is provided to modify the impact generated noise spectrum as well as the chordal action generated noise spectrum.

FIG. 1 illustrates a top view of a portion of each of two chain assemblies 10, 12 that incorporate one embodiment of the present invention. The first chain assembly 10 and the second chain assembly 12 are each formed by a plurality of interleaved rows 14, 16, 18 or sets of links 20. The links 20 are shown in more detail in FIGS. 2 and 3. Each link includes a main body portion 22 and a pair of depending teeth 24, 26 or toes. The toe has a height 28 that is defined by the distance from the top 30 of the link main body 22 to the bottom tip 32 of the toe 24.

The links also include a pair of apertures 34, 36 for placement of the pivot members or pins 38, 40. Round pins and associated round apertures are shown in FIGS. 2 and 3, but the present invention contemplates other types of pivot means, such as pins and associated rocker joints. The pitch length 42 of the round apertured links shown in FIG. 3 is the distance from the center 44 of a first aperture 34 to the center 46 of the second aperture 36.

The chain assembly includes sets or rows of links that extend across the width of the chain and includes several interleaved links. The rows are then interleaved with adjacent rows to form the endless chain assembly.

Each tooth of the link is formed by an inside flank 48 and an outside flank 50. The configuration of the inside and outside flanks may be substantially straight or arcuate, and may be constructed to affect the portion of the link tooth that contacts the associated sprocket tooth. The chain assembly may be of a hybrid or random type in which links are provided in two different configurations, such as shown in U.S. Pat. No. 4,342,560, which is incorporated herein by reference. The two inside flanks converge at the crotch 52 of the link. In the link shown in FIG. 3, the crotch includes a horizontal crotch portion 54 that extends from one inside flank 48 to the other inside flank 56. The main body of the link includes the portion 57 between the horizontal crotch portion 54 and the top portion 30 of the link.

As noted above, the pitch length 42 of the chain of FIG. 2 is defined as the distance between the centers 44, 46 of the round apertures on each link. In the preferred embodiment of this invention, the chain links are of matching pitch length, within manufacturing and other design tolerances.

The pitch length 58 of the sprocket 60 is the distance between the centers 62, 64 of adjacent sprocket teeth as measured along the sprocket pitch circle 66. In conventional chain and sprocket assemblies, the pitch length 42 of the chain is matched as closely as possible to the pitch length 58 of the associated sprockets. In the preferred embodiment of the present invention, however, the pitch length of the chain differs from the pitch length of the sprocket. Preferably, the pitch length of the chain is approximately twice the pitch length of the sprocket. However, the pitch length of the links may be any integral multiple of the pitch length of the sprocket. In such a chain and sprocket combination, the teeth of a single link will seat in the sprocket teeth roots in such a manner as to have two sprocket teeth included between the chain teeth. In the chain link shown in FIG. 3, the pitch length 42 of the main body portion of the link is preferably equal to or greater than the height 28 from the top of the link to the tip of the toe. Of course, other link designs are possible that come within the scope of the present invention.

In the embodiment shown in FIG. 1, two chain assemblies are provided in side-by-side but spaced apart relation. Each chain assembly is constructed of the links of FIG. 3 in which the pitch length of the links is approximately twice the pitch length of the associated sprocket teeth. The two chains are associated with side-by-side sprockets. The sprocket teeth are not circumferentially offset. Thus, FIG. 2 shows the links of the second chain 12 in phantom contacting the teeth of the adjacent sprocket.

The above-described chains and sprockets of unmatched pitch lengths will provide a phased relationship between the chain and the sprockets. As the links of each chain enter the driving sprocket, successive rows of chain teeth will contact every other sprocket tooth. In other words, the first row of chain teeth will contact a sprocket tooth and then skip the adjacent sprocket tooth. The second successive row of chain teeth will then contact the third sprocket tooth. As the chain seats into the sprocket, the inverted teeth of the chain will fit into every other root of the associated sprocket.

By providing two such chains in offset relationship, the first chain will contact the sprocket teeth in a sequence of the first, third, fifth, and the remaining "odd" numbered sprocket teeth. The second chain, by being offset by one-half chain pitch from the first chain, will contact the sprocket teeth of the adjacent sprocket in a sequence of the second, fourth, sixth, and the remaining "even" numbered sprocket teeth. As noted above, the two adjacent sprockets are preferably not circumferentially offset, and thus the first, second, third and remaining teeth of the first sprocket are circumferentially aligned with the first, second, third and remaining teeth of the second sprocket.

The above-described assembly achieves a phased system by having the teeth of one chain contact the sprocket teeth of the first sprocket out of phase by one sprocket tooth with the contact of the second chain teeth with the second sprocket teeth. The assembly achieves a phased chain system without the necessity to provide circumferentially offset sprockets. Use of a chain assembly or sprocket constructed in accordance with the teachings of this invention is expected to result in the generation of a noise pattern that is modified in comparison with the noise pattern generated by a chain and sprocket in which all of the links are of identical configuration and no phasing relationship is present between the chains or sprockets in the assembly.

The chain assembly of this invention is suitable for use with a variety of chain types and sprocket tooth forms. For example, the first unmatched chain and sprocket could be utilized in side-by-side relation with a second chain and sprocket of matched pitch length. Of course, some combinations of chain assemblies and sprockets will provide less objectionable noise characteristics than other combinations.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A chain assembly, comprising:

a plurality of interleaved rows of flat, plain inverted tooth links, pivot pins connecting adjacent rows of links, each link including a pair of apertures for receiving said pivot pins, each of said interleaved rows including at least three flat, plain inverted tooth links therein, each of said links including a flat planar main body portion and a pair of flat planar toes depending from said main body portion, said toes defining a first length extending from the bottom-most portion of said toes to the top of said link main body portion, said apertures defining a second length extending between the center points of each of said apertures, said second length being greater than said first length for each of said links.

2. The chain assembly of claim 1 wherein said pair of depending toes include a horizontal crotch portion, said horizontal crotch portion having a third length extending between the points of intersection of each of said toes with said link main body portion, said third length being greater than said first length.

3. The chain assembly of claim 1 wherein said toes are constructed and arranged to contact the teeth of a sprocket, said pair of toes being separated by a sufficient distance to permit said toes to fit into every other root of said associated sprocket.

* * * * *